United States Patent
Jana

(10) Patent No.: US 12,242,409 B2
(45) Date of Patent: Mar. 4, 2025

(54) SYSTEMS FOR METHODS OF THROTTLING IN A NETWORK

(71) Applicant: Avago Technologies International Sales Pte. Limited, Singapore (SG)

(72) Inventor: Arun Prakash Jana, Bangalore (IN)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 18 days.

(21) Appl. No.: 17/968,379

(22) Filed: Oct. 18, 2022

(65) Prior Publication Data
US 2024/0126713 A1    Apr. 18, 2024

(51) Int. Cl.
*G06F 13/40*    (2006.01)

(52) U.S. Cl.
CPC ............... *G06F 13/4059* (2013.01)

(58) Field of Classification Search
CPC .................................. G06N 20/00
See application file for complete search history.

(56) References Cited

U.S. PATENT DOCUMENTS 6,718,445 B1 *  4/2004  Lewis ............ G06F 12/126
                                               711/170
10,423,357 B2 *  9/2019  Simionescu ......... G06F 3/0658

* cited by examiner

*Primary Examiner* — Henry Tsai
*Assistant Examiner* — Juanito C Borromeo
(74) *Attorney, Agent, or Firm* — Foley & Lardner LLP

(57) ABSTRACT

Systems and methods of communicating use device level throttling. Some embodiments relate to a method of communicating in a network. The systems and methods can provide a first communication associated with a device for issuance, issue the first communication if a queue depth value for the device is less than an issued communication value, and listing the first communication on a pend list for the device if a queue depth value for the device is less than the issued communication value.

20 Claims, 4 Drawing Sheets

| Field Name | Size | Values | Description |
|---|---|---|---|
| QueueDepth | 2 bytes | n (>0) - QD value<br>0 - disabled | Queue Depth of the DevH |
| MaxQueueDepth | 2 bytes | n (>0) - QD value<br>0 - disabled | User-configured maximum Queue Depth must be >= QueueDepth if non-zero) |
| HeadPtr | 2 bytes | LMID | Head LMID in Pend List |
| TailPtr | 2 bytes | LMID | Tail LMID in Pend List |
| PendCount | 2 bytes | n | Number of pended IOs |
| IssuedIOCount | 2 bytes | n (<=DevQueueDepth) | Number of outstanding IOs with DevH |
| IOType | 1 bit | 0 - QD set for Read<br>1 - QD set for Write | Queue Depth by IO Type |
| QueueDepthErr | 1 bit | 0 - No error<br>1 - Error | QueueDepth > MaxQueueDepth |
| QueueDepthErrMask | 1 bit | 0 - No interrupt<br>1 - Generate interrupt | Control interrupt generation on QueueDepthErr |

FIG. 2

SYSTEMS FOR METHODS OF THROTTLING IN A NETWORK

FIELD OF THE DISCLOSURE

This disclosure generally relates to computer networking, storage networking and communications. Some embodiments of the present disclosure are related to systems for and methods of throttling in a network or controlling input/output access and throughput in a network.

BACKGROUND OF THE DISCLOSURE

In the last few decades, the market for network communications devices has grown by orders of magnitude, fueled by the use portable devices, and increased connectivity and data transfer between all manners of devices. Digital switching techniques have facilitated the large scale deployment of affordable, easy-to-use communication networks including storage networks (e.g., storage area networks (SANs)). Wireless communication may operate in accordance with various standards such as IEEE 802.11x, IEEE 802.11ad, IEEE 802.11ac, IEEE 802.11n, IEEE 802.11ah, IEEE 802.11aj, IEEE 802.16 and 802.16a, Bluetooth, global system for mobile communications (GSM), code division multiple access (CDMA), and cellular technologies.

SANs connect computer data storage to servers in commercial data centers. SANs can use a Fibre Channel (FC) protocol which is a high-speed data transfer protocol providing in-order, lossless delivery of raw block data. When a network node or link is carrying more data than it can handle, that link creates congestion in the network resulting in overall reduced network throughput (e.g., for other fabric devices, such as, fibre channel host bus adaptors (HBAs) or storage adapters, ethernet converged network adapters (CNA), security adapters, or other communication devices). Standards can provide protocols for reducing or preventing congestion on the network.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 2 is a schematic block diagram of a register file used by the storage controller illustrated in FIG. 1 according to some embodiments;

DETAILED DESCRIPTION OF EMBODIMENTS

Figure 1:
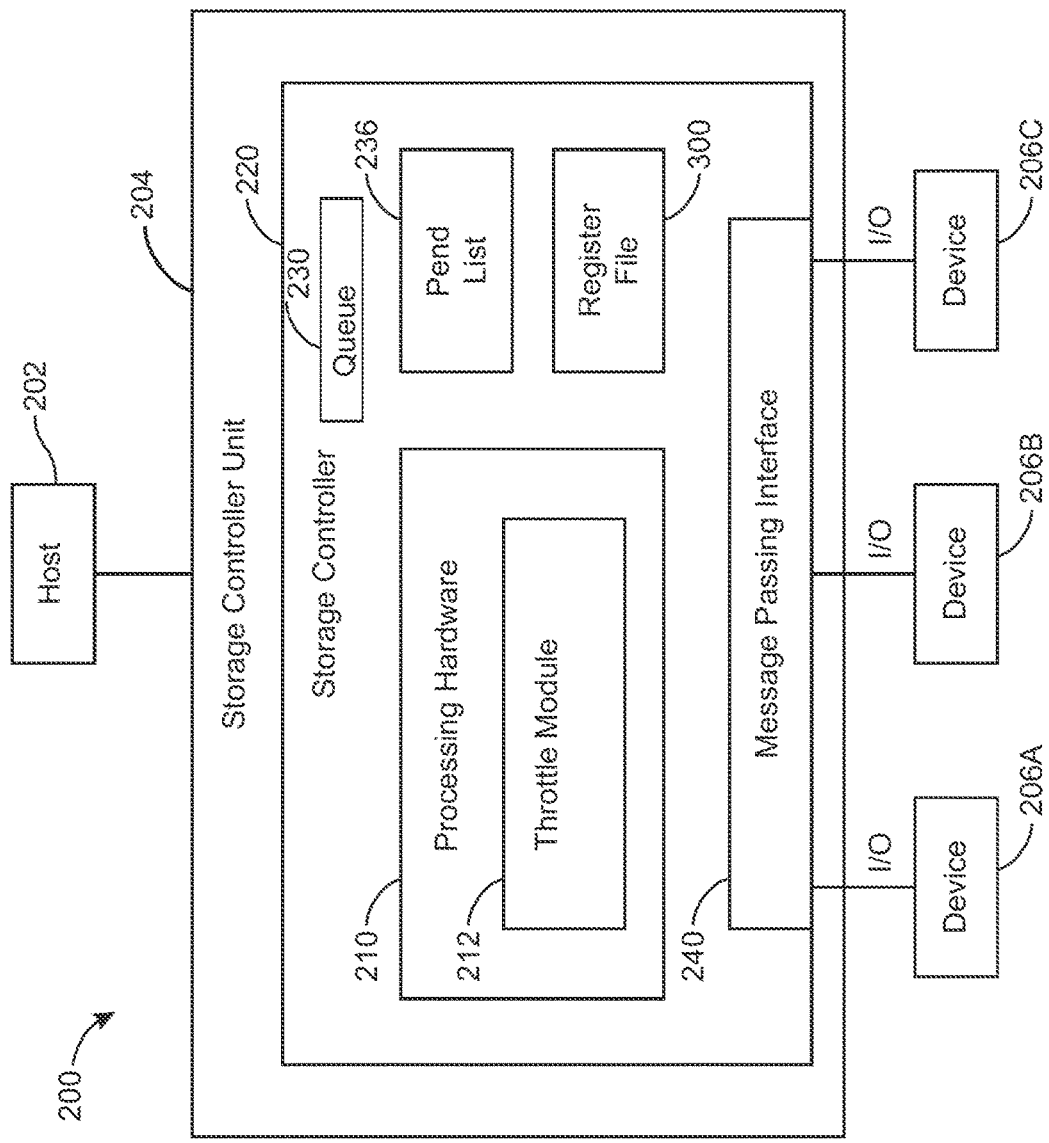
FIG. 1 is a schematic block diagram of a network including a storage controller configured to use input output (10) device throttling techniques according to some embodiments.

The following IEEE standard(s), including any draft versions of such standard(s), are hereby incorporated herein by reference in their entirety and are made part of the present disclosure for all purposes IEEE 802.3, IEEE 802.11x, IEEE 802.11ad, IEEE 802.11ah, IEEE 802.11aj, IEEE 802.16 and 802.16a, and IEEE 802.11ac. In addition, although this disclosure may reference aspects of these standard(s), the disclosure is in no way limited by these standard(s). Some standards may relate to storage area networks (SANs) for connecting computer data storage to servers in commercial data centers. SANs can use a Fibre Channel (FC) standard/protocol, small computer system interface (SCSI) interface standard/protocol, asynchronous transfer mode (ATM) protocol, and synchronous optical networking protocol (SONET), all of which are incorporated herein by reference in their entireties.

Some embodiments of systems and methods utilize device input output (TO) communication throttling or access control in a network. Throttling may refer to a technique used to more efficiently handle memory processing where memory request rates are selectively adjusted. In some embodiments, throttling can control the amount of resources that are used when the system is processing IO communications. In some embodiments, throttling causes a system to either process the IO communications, or delays the processing of the IO communications to free resources for more critical IO communications. In some embodiments, a system can perform throttling to delay processing of IO operations for offload IO operations. In some embodiments, IO throttling operations are dynamic and performed in hardware (e.g., without operating system (OS) device software intervention). Some embodiments achieve advantages of device IO access control without exposing a global host queue depth to the OS device driver. Some embodiments of systems and methods dynamically change the host queue depth and provide per device (logical device (LD) or just a bunch of disks (JBOD) granularity. The term hardware and hardware circuit may refer to any circuitry or circuit that performs an operation without OS device software intervention including but not limited to processors, dedicated circuits, programmable logic devices, ASICs, and combinations thereof. Hardware may be configured by or execute non-OS software in some embodiments. Circuitry may refer to any electronic circuit or circuits.

In some embodiments, a storage controller includes a command dispatcher unit that performs per-device dynamic IO throttling. In some embodiments, per-device dynamic IO throttling can be controlled from an application. Per device IO throttling may refer to throttling that can performed with respect to a particular device as opposed to all devices at once in the system. Per device dynamic IO throttling may refer to throttling that can performed with respect to a particular device as opposed to all devices in the system at once where throttling parameters can be changed and are not fixed. In some embodiments, a device IO throttling mechanism is used to provide device level queue depth control to:

1. prevent depletion of transient runtime resources like host scatter gather list (HSGL) and hash slot elements, internal scatter gather lists (ISGLs), and/or redundant array of independent disks (RAID) scatter gather lists (RSGLs) after the usage reaches a threshold;
2. prevent the system from becoming non-functional when resources like ISGLs are pinned with dirty data and cannot be released;

3. ensure that the resources can be uniformly distributed among multiple device handles by limiting the queue depth for each device handle;
4. allow firmware to maintain multiple sets of requestor based queue depth settings;
5. apply queue depth by IO type (read or write); and/or
6. allow users to set a limit on the number of IOs a specific device handle should have active (e.g., devices with a bootable OS may not require a very high queue depth).

In some embodiments, a per device queue depth is not controlled by an OS device driver and can be changed dynamically at a per-device (LD or JBOD) level to achieve granularity. In some embodiments, the HSGL is created by the command dispatch unit to represent direct memory access (DMA) operations to/from host memory. In some embodiments, the RSGL is created by a RAID manager in the RAID-On-Chip controller to represent DMA operations to/from dynamic random access memory (DRAM). In some embodiments, the ISGL is created by a buffer manager in the RAID-on-chip controller for representing DMA operations to/from DRAM.

Some embodiments relate to a method of communicating in a network. The communications are controlled by a controller. The method includes providing a first communication associated with a device for issuance, issuing the first communication if an issued communication value is less than a queue depth value for the device, and listing the first communication on a pend list for the device if a queue depth value for the device is less than the issued communication value. The queue depth value is indicative of an amount of a queue available for the issued communications for the device, and the issued communication value is indicative of an amount of communications for the device stored in the queue. Listing may refer to the placing on a list which can be manifested in any form including but not limited to a head and tail pointer scheme, tabular, etc. The placement can occur in any order (e.g., priority, time of receipt, time for transmission, time of placement, random, etc.) A pend list may refer to a list of communications (e.g. IO communications) awaiting issuance to a queue (e.g., queue 230 configured to store communications for transmission). The pend list can be stored in any type of storage or memory and can store any type of representation of communications (e.g., IO communications stored using a head and tail pointer scheme). A pend list buffer may refer to a buffer for storing the pend list in some embodiments. A buffer may refer to any type of memory or storage device. A communication may refer to any transfer of data including but not limited to IO communications. IO communications can be of any form including but not limited to programmed IO communications, interrupt-initiated communications, direct memory access (DMA) communications, communications between a host and devices, and communications between devices. IO communications can be read communications where data is requested and write communications where is data requested to be stored.

In some embodiments, the method further includes issuing the first communication if the queue depth value for the device is not more than zero. In some embodiments, the method further includes listing the communication on the pend list for the device if a pend count value for the device is not zero. The pend count value is indicative of the number of communications on the pend list. In some embodiments, the pend list uses a head pointer and tail pointer to indicate communications on the pend list. In some embodiments, the method performs device level throttling without operating system intervention from a host. In some embodiments, the method performs hardware based device level throttling. A queue depth for a device may refer to an amount of a queue available for the issued communications for the device. A queue depth value for a device can be stored in any type of memory or storage (e.g., register, buffer, field, etc.) and can reflects an amount of a queue available for the issued communications for the device in some embodiments. A queue may refer to any type of memory or storage device. In some embodiments, the queue stores identifications of communications in a retrievable order (e.g., first in, first out, etc.). An issued communication value for a device may refer to a value that can be stored in any type of memory or storage (e.g., register, buffer, field, etc.) that reflects an amount of communications for the device being stored in the queue or an amount of use of the queue by issued communications. A pend count value for a device may refer to a value that can be stored in any type of memory or storage (e.g., register, buffer, field, etc.) that reflects an amount of communications for the device being provided on the pend list.

In some embodiments, the method further includes decrementing the issued communication value when the first communication is completed, and issuing a second communication from the pend list if the issued communication value is less than the queue depth value. In some embodiments, the method further includes issuing a second communication from the pend list if a new queue depth value is provided that is greater than the queue depth value. In some embodiments, the method performs device level throttling and the device level throttling is disabled if the queue depth value is set to zero. In some embodiments, the method is performed on a command dispatch unit.

Some embodiments relate to a memory controller. The memory controller includes a pend list buffer for storing a number of pended communication identifications coupled to the memory controller, a queue buffer for storing a number of issued communication identifications coupled to the memory controller, and a circuit configured to perform device level throttling. The circuit is configured to issue a first communication for translation if a queue depth value is less than an issued communication value. The queue depth value is indicative of an amount of the queue buffer available for the issued communication identifications from a first device, and the issued communication value is indicative of an amount of issued communications to the queue buffer for the first device.

In some embodiments, the circuit is configured to list the first communication in the pend list buffer if the queue depth value for the device is less than the issued communication value. In some embodiments, the first communication is untranslated when listed on the pend list. In some embodiments, the set of registers includes a tail pointer register and stores information related to the first communication when listed on the pend list. In some embodiments, the circuit is hardware circuit. A register refers to any type of storage or memory including but not limited to temporary storage within processing hardware.

Some embodiments relate to a memory controller further including a set of registers comprising a first register for the queue depth for the first device and a second register for the issued communication value for the first device. In some embodiments, the set of registers includes a third register for the queue depth for a second device and a fourth register for the issued communication value for the second device.

Some embodiments relate to a method of communicating in a network. The communications are controlled by a controller. The method includes receiving by the controller a new queue depth value for a device; determining if the new queue depth value is more than a current queue depth value, and issuing a first communication on a pend list for the device if the new queue depth value is more than a current queue depth value. The queue depth value is indicative of an amount of a queue available for the issued communications for the device;

In some embodiments, the queue depth value is for a read communication. In some embodiments, the queue depth value is for a write communication.

Prior to discussing specific embodiments of the present solution, it may be helpful to describe aspects of the operating environment as well as associated system components (e.g., hardware elements) in connection with the methods and systems described herein. The systems and methods can be employed in various types of networks. Some embodiments of networks include or are in communication with a SAN, security adapters, or ethernet CNA. In brief overview, the network environment includes a wireless communication system that includes one or more access points, one or more wireless or wired communication devices and a network hardware component. The wireless or wired communication devices may for example include laptop computers, tablets, personal computers, wearable devices, vehicles (e.g., automobiles, drones, smart vehicles, robotic units, etc.), switches, routers, and/or cellular telephone devices. The network environment can be an ad hoc network environment, an infrastructure wireless network environment, a wired network coupled to a wireless network, a subnet environment, etc. In some embodiments, the network environment includes a host bus adaptor (HBA), a switched network, a target HBA, and a target host. A network arranged as an FC SAN can be included in some embodiments. Aspects of the operating environments and components described above will become apparent in the context of the systems and methods disclosed herein With reference to FIG. 1, a network 200 includes a host 202, a storage controller unit 204, and devices 206A-C. Storage controller unit 204 is any type of apparatus and includes a storage controller 220 and a message passing interface 240 in some embodiments. Storage controller 220 includes processing hardware 210, a pend list 236, a register file 300, and a queue 230, in some embodiments. Host 202 includes an OS. A memory controller (e.g., storage controller 200) may refer to any device that controls or processes communications (e.g., IO communications) for communication across network 200. The memory controller communicates communications using message parsing interface 240 in some embodiments.

Processing hardware 210 is implemented as a hardware engine, an ASIC constructed according to the packet processing rules, a field programmable gate array (FPGA) or logical device, a communications processor, or any other type and form of dedicated semiconductor logic or processing circuitry capable of processing or supporting communications as described herein. In some embodiments, processing hardware 210 is a hardware device (e.g., ASIC and dedicated circuitry) for performing throttling operations that does not rely upon OS software for performing the throttling operations. Processing hardware processor 210 can receive data from software based applications executed by host 202 and devices 206A-C in some embodiments. In some embodiments, processing hardware 210 is a controller that performs operations in response to firmware or other software.

The network 200 can be utilized with various types of computing and communication components. For example, network 200 can include two or more devices in communicating with each other via cable, wire, or wireless mediums. In some embodiments, network 200 includes a target host or host 202. The network 200 is a high-speed network that connects host 202 to a target or data storage such as devices 206A-C (e.g., a high-performance storage subsystem) in some embodiments. The network 200 can access storage processors (SPs), and storage disk arrays embodied as devices 206A-C in some embodiments. Devices 206A-C can be any type electronic device that participates in communications (e.g., IO communication) and can be LDs or JBODs in some embodiments. The network 200 can include a switched network coupled between storage controller unit 204 and devices 206A-C.

The switched network includes receive ports, transmit ports, and a buffer or cross bar switch. The switched network is a fabric switched network, arbitrated loop network, or point-to-point network in some embodiments. The receive ports and transmit ports, can be associated with servers, hubs, switches, routers, directors, nodes or other devices. The switched network can include the physical layer, interconnect devices, and translation devices.

Storage controller unit 204 is a server storage integrated circuit-based product that provides communication connectivity in some embodiments. Storage controller unit 204 provides data center and storage operations for a peripheral component interconnect express (PCIe) fourth generation (Gen4) standard expansion bus in some embodiments. In some embodiments, storage controller unit 204 is or is part of a serial advanced technology attachment (SATA), Serial-attached SCSI (SAS) controller, an SAS redundant array of independent disks (RAID) controller, and/or a host bus adapter. In some embodiments, storage controller unit 204 is or is part an SAS IO controller, RAID-on-Chip (ROC) IC, and SAS expander IC. In some embodiments, storage controller unit 204 provides connectivity for direct-attached storage, such as, devices 206A-C(e.g., low latency flash storage arrays, solid state drives, fibre channel storage systems, and hard disk drive HDD arrays).

In some embodiments, storage controller unit 204 is integrated with host 202, a line card, mezzanine card, motherboard device, IC package, a stand alone device or other device. Storage controller unit 204 is provided in an integrated circuit package including processing hardware 210, a queue 230, a pend list 236, and a message passing interface 240. Message passing interface 240 is in communication with devices 206A-C directly or indirectly (e.g., via a switched network or other devices). Storage controller unit 204 translates message passing interface (MPI) message frames on the message passing interface 240 to a translated IO and allocates resources for the processing the message frames in some embodiments. The IOs are translated into frames that the other hardware units in the storage controller unit 204 can process in some embodiments. Storage controller unit 204 can be any type of device for processing data communications between host 202 and devices 206A-C.

The message passing interface 240 is an interface between storage controller unit 204 and devices 206A-C. In some embodiments, message passing interface 240 operates according to a standardized and portable message-passing MPI standard designed to function on parallel computing architectures. The MPI standard defines the syntax and semantics of library routines that are useful to a wide range of users writing portable message-passing programs in C, C++, and Fortran in some embodiments. In some embodiments, the storage controller unit 204 copies the data from the host 202 and allocates resources for the translation if device throttling is not needed. Data associated with IOs is provided across interface 240

Queue 230 and pend list 236 are a storage devices (e.g., memory) configured to store representations of pending IOs and pended IOs. IOs refer to IO communications. Each issued IO communication is stored in entries of queue 230 as a device handle which is a name the operating system uses to identify a storage resource and the correct means (e.g. driver or system call) to access it in some embodiments. The entries can store additional information about the IO connection. Queue 230 can be separate queues or combined queues for read and write operations. In some embodiments, a queue 230 is provided for each of devices 206A-C. Queue 230 can be a separate read buffer and write buffer (first-in-first-out buffer) for tracking issued IOs. In some embodiments, queue 230 is a universal queue for all devices where a separate queue depth is tracked for each device. Queue 230 and the buffer for pend list 236 can be single storage device.

Pend list 236 stores pended IO communications that are waiting to be issued. Header and tail pointer mechanisms can be used to store the IOs in the pend list 236. In some embodiments, the pend list 236 is a per device linked list where the first IO and last IO of the linked list is indicated by a tail pointer and a head pointer. Each IO includes a next pointer pointing to the next IO in the linked list and the next pointer of the last IO (indicated by the tail pointer) points to a null reference, indicating the end of the list. Pend list 236 is a per device (devices 206A-C) linked list in some embodiments. In some embodiments, there is a separate pend list for read and write operations for each device. In some embodiments, IOs are untranslated when issued from pend list 236, and a command dispatch unit (CDU) of the storage controller unit 204 translates the untranslated IOs into frames that the other hardware units in the storage controller unit 204 understand. An untranslated communication (e.g., IO) may refers to a communication (e.g., 10) that has not yet been translated into frames suitable for complete processing by the hardware of storage controller unit 204. Translation can involve frame processing and protocol processing by the command dispatch unit in some embodiments. A head pointer may refer to an indication of an origin or first communication in a linked list and a tail pointer may refer to an indication of the end or last communication in the linked list. A head pointer register may refer to a register for storing an indication of an origin or first communication in a linked list and a tail pointer register may refer to a register for storing an indication of the end or last communication in the linked list. Pended communications may refer to communications stored on a pend list (e.g., pend list 236). Pended communications are stored on the pend list as the communications await an opportunity to be provided to the queue for transmission (e.g., queue 230) in some embodiments.

Register file 300 includes a set of registers configured to store information for controlling IO processing by storage controller unit 204. Register file 300 can include a set of registers for each device 206A-C(e.g., a per device register file). In some embodiments, there is a register file for read and write operations for each device. Some embodiments of register file 300 are described in more detail below with respect to FIG. 2.

Processing hardware 210 is configured to include a command dispatch unit and includes a throttle module 212 configured to implement per-device dynamic IO throttling. In some embodiments, processing hardware 210 performs flow control operations faster than software OS-based operation. In some embodiments, processing hardware 210 is configured to distribute HSGLs among the devices 206A-C to ensure that the communication processing resources are not used up by one or two devices 206A-C. In some embodiments, module 212 is an exclusively hardware module or a combination of hardware and software that performs per device throttling using register file 300 and pend list 236. Module 212 and processing hardware 210 are any circuits or components that can perform logic and communication processing for the throttling operations described herein. In some embodiments, module 212 and processing hardware 210 are implemented as a field-programmable gate array, an application-specific integrated circuit, hardware, software executing processor, or state machines The processing hardware 210 uses the queue 230 to buffer or store information for issued IO connections. Processing hardware 210 pends untranslated IOs if the total number of outstanding IOs (Issued IO Count value) with a device (of devices 206A-C) has reached the queue depth limit (Queue Depth value) for the device. Per device limits and numbers of outstanding IOs are tracked via register file 300 as discussed below according to some embodiments. Processing hardware 210 pends untranslated IOs by placing the untranslated IOs on pend list 236 in an order in which received (first in, first out). When an issued IO is completed by one of devices 206A-C via communication across message passing interface 240, a previously pended IO (if one exists), is un-pended and issued by storage controller unit 204. An update of the Queue Depth value triggers issue of an untranslated IO from pend list 236 if the new Queue Depth value is higher than the previous (current) value. Disabling the queue depth (e.g., set Max Queue Depth value or Queue Depth to zero) causes storage controller unit 204 to issue all IOs from the pend list 236.

With reference to FIGS. 1 and 2, processing hardware 210 and throttle module 212 use a set of registers in register file 300 for each of devices 206A-C to control additions and removals of IOs to and from pend list 236 and to issue IOs according to device throttling provided by throttle module 212. Register file 300 can be provided for a read queue and a write queue. Exemplary sizes, values, field names and descriptions for register file 300 are provided in FIG. 2. Register file 300 is temporary storage within processing hardware 210 in some embodiments. Issuing or issuance of a communication (e.g., an IO) may refer to the placement of the communication (e.g., the IO) or identification thereof from the pend list or from another source (e.g., including sources internal to storage controller unit 204) to a queue for processing and/or eventual communication to host 202 or through message parsing interface 240. In some embodiments, the IO communication can be processed for communication either directly, from the pend list 236, or from another source in some embodiments. An issued communication may refer to a communication that has undergone or begun issuance. Issued communications may refer to more than one communication that has undergone or begun issuance. An issued communication or identification thereof is stored on the queue until transmitted in some embodiments.

In some embodiments, register file 300 includes a queue depth register 302 for storing a Queue Depth value for a device of devices 206A-C; a maximum queue depth register 304 for storing a Max Queue Depth value for a device of devices 206A-C; a head pointer register 306 for storing a head pointer (Head Ptr) to the IO at the top of the pend list 236; a tail pointer register 308 for storing a tail pointer (Tail Ptr) to the IO at the bottom of the pend list 236; a pend count register 310 for storing a number of pended IOs (Pend Count value) of the pend list 236; an issued IO count register 312 for storing a number of outstanding IOs (Issued IO Count value); an IO type register 314 for storing an IO type value (read or write); queue depth error register 316 for storing a Queue Depth Err value (e.g., an error is indicated when Queue Depth is greater than Max Queue Depth); and a queue depth error mask register 318 for storing a Queue Depth Err Mask value (e.g., a value for interrupt generation based upon the Queue Depth Err value).

In some embodiments, firmware can be used to control throttling of devices 206A-C by providing the desired values for register file 300 (e.g., Queue Depth value in queue depth register 302). In some embodiments, user-space applications can set the Max Queue Depth value in register 304 through firmware in some embodiments. If not set explicitly by the application, the field is disabled (set to zero), thereby disabling device throttling in some embodiments. The Queue Depth value cannot exceed Max Queue Depth (if non-zero) at any point. Hence, if throttling is already applied on the device and the Queue Depth value is greater than the Max Queue Depth value that the application sets, the Queue Depth value is set to Max Queue Depth value. In some embodiments, the firmware activates, updates and disables the Queue Depth value for a device depending on the system conditions and/or design criteria. A device application can configure the Max Queue Depth value or disable throttling by setting to the Max Queue Depth value to zero.

Figure 3:
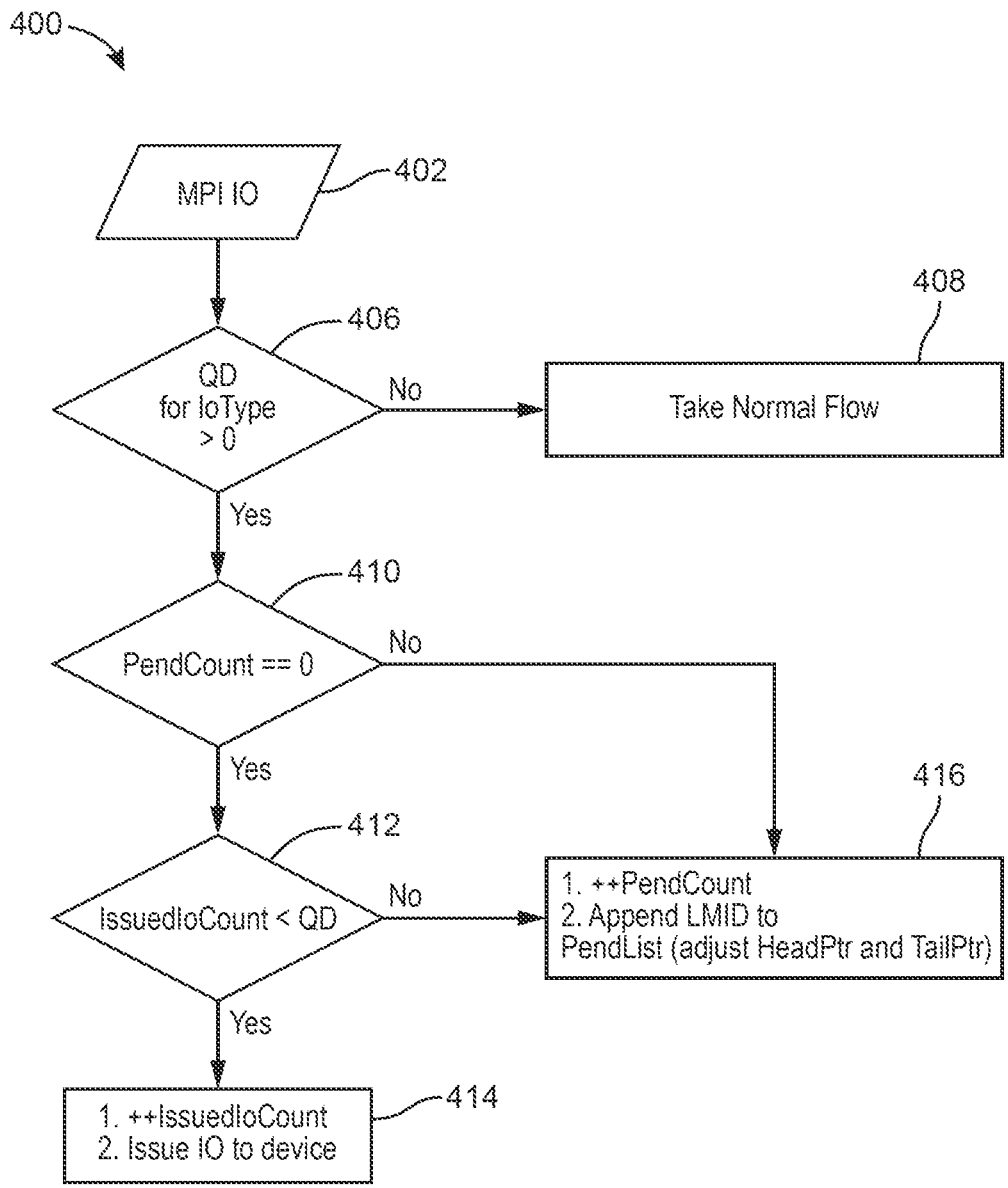
FIG. 3 is a schematic flow diagram showing an exemplary inbound IO device throttling operation in a network similar to the network illustrated in FIG. 1 according to some embodiments.

With reference to FIGS. 1-3, storage controller unit 204 performs inbound IO throttling according to a flow 500. Flow 400 is used to issue an incoming IOP or place it on the pend list 236 using the Head Ptr, Tail Ptr, Pend Count, and Issued IO Count values in register file 300 for each device of devices 20A-C.

Flow 400 includes an operation 402 where an incoming IO (e.g., an MPI IO) is received. At an operation 406, throttle module 212 determines if the Queue Depth value in register 302 for the IO type is more than 0. If not, normal flow is taken at an operation 408. The normal flow involves issuing the IO directly. If so, flow 400 advances to operation 410.

At operation 410, the Pend Count value is received. If the Pend Count value in register 310 is zero, flow 400 advances to an operation 412. If the Pend Count value in register 310 is not zero, flow 400 advances to an operation 416. At operation 416, the Pend Count value in register 310 is increased by 1 and the IO is added to the pend list 236. The IO is added to the pend list 236 by adjusting the tail pointer in register 308 and the head pointer in register 306 and the next pointer in the neighboring IO to place the IO on the linked list defined in registers 306 and 308.

At operation 412, the Issue IO Count value is received. If the Issued IO Count value in register 312 is less than the Queue Depth value, flow 400 advances to an operation 414. In operation 414, the Issued IO count value in register 312 is increased by 1 and the IO is issued. If the Issued IO Count value in register 312 is more than or equal to the Queue Depth value in register 302, flow 400 advances to an operation 416. After operations 414 and 416, storage controller unit 204 returns to operation 402.

Figure 4:
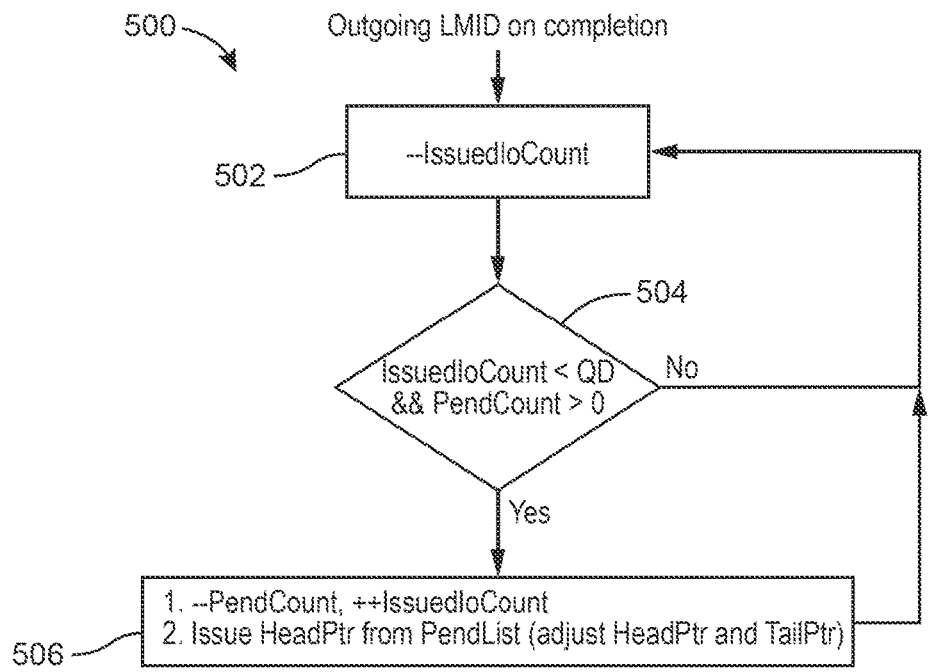
FIG. 4 is a schematic flow diagram showing an exemplary issuance operation in a network similar to the network illustrated in FIG. 1 according to some embodiments.

With reference to FIG. 4, storage controller unit 204 issues a pending IO from the pend list 236 according to a flow 500. Storage controller unit 204 uses the pend list 236 and the Head Ptr, Tail Ptr, Pend Count, and Issued IO Count values in register file 300 to perform flow 500 in some embodiments.

Flow 500 includes an operation 502 where an indication of an outgoing IO completion is received and the Issued IO Count value in register 312 is decremented. At an operation 504, throttle module 212 determines if the Issued IO Count value is less than the Queue Depth value and the Pend Count value is greater than 0. If so, flow 400 advances to operation 506. If not, flow 500 returns to operation 502 and awaits for an indication of an issued IO completion because another IO cannot be issued because it does not exist or because the Queue Depth value for the device has been exceeded.

At operation 506, the Pend Count value in register 310 is decreased by 1 and the Issued IO Count value is increased by 1. The IO is issued and the identification of the IO is removed from the linked list in the pend list 236 by adjusting the tail pointer in register 308 (if necessary) and the head pointer in register 306.

Figure 5:
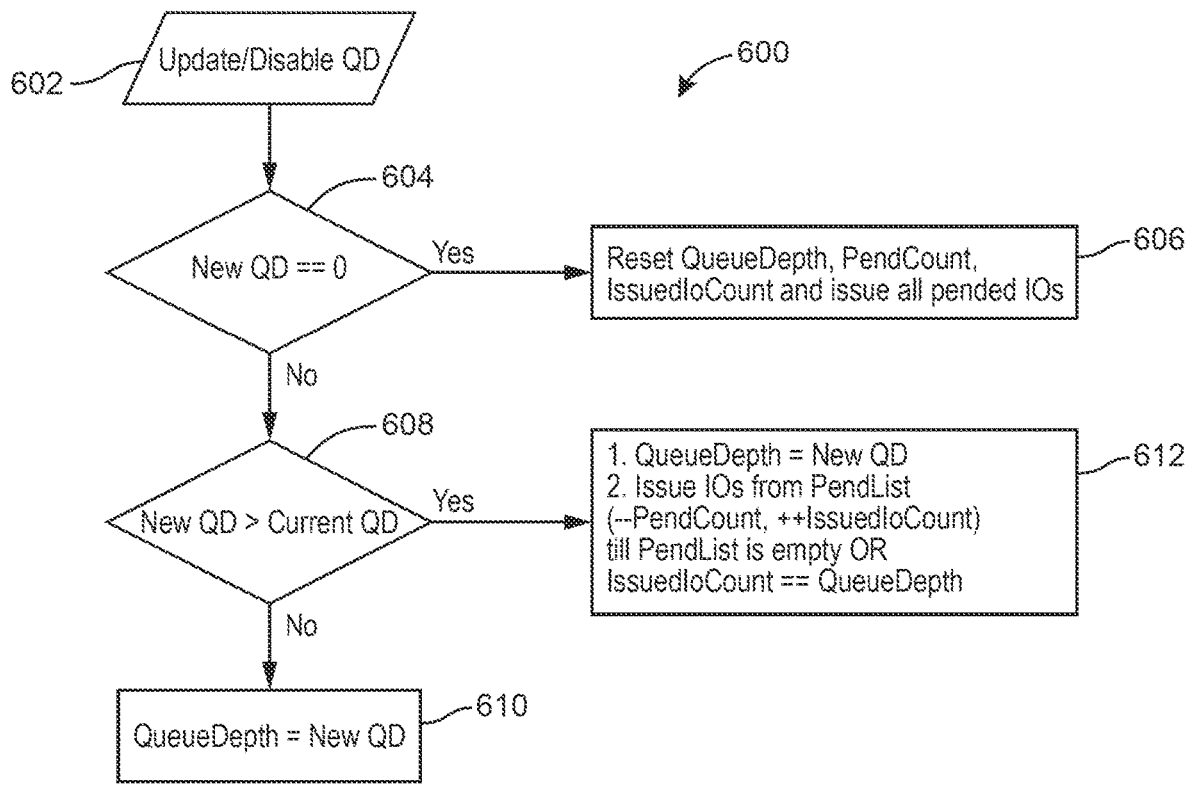
FIG. 5 is a schematic flow diagram showing an exemplary unpend operation in a network similar to the network illustrated in FIG. 1 according to some embodiments.

With reference to FIG. 5, storage controller unit 204 issues a pending IO from the pend list 236 in the event of a queue depth change according to a flow 600. Storage controller unit 204 uses the pend list 236 and the Head Ptr, Tail Ptr, Pend Count, and Issued IO Count values in register file 300 in flow 600 in some embodiments.

Flow 600 includes an operation 602 where the Queue Depth value for a device is updated or disabled. At an operation 604, throttle module 212 determines if the new Queue Depth value for the IO type is 0. If so, flow 600 advances to an operation 606. At operation 606 throttling is disabled. At operation 606, the Queue Depth value in register 302, the Pend Count value in register 310, and the issued IO Count value in register 312 are reset. In operation 606, all pended IOs in the pend list 236 are issued.

If the new Queue Depth value for the IO type is not 0 at operation 604, flow 600 advances to an operation 608. At operation 608, throttle module 212 determines if the new Queue Depth value for the IO type is more than the previous or current Queue Depth value in register 302. If the new Queue Depth value for the IO type is more than the previous or current Queue Depth value in register 302, flow 600 advances to an operation 612. If not, flow 600 advances to an operation 610. At operation 612, the new Queue Depth value for the IO type is written to the register 302 and the IOs from the pend list 236 are issued until the pend list 236 is empty or the Issued IO Count equals the Queue Depth value. The Pend Count value are decremented and the Issued IO Count values are incremented according to the number of issued IOs. At operation 610, the new Queue Depth value for the IO type is written to the register 302. After operations 610 and 612, flow returns to operation 602.

The construction and arrangement of the systems and methods as shown in the various exemplary embodiments are illustrative only. Although only a few embodiments have been described in detail in this disclosure, many modifications are possible (e.g., variations in port or destination quantity, data types, methods of reinsertion, reintroduction, etc., values of parameters, arrangements, etc.). For example, the position of elements may be reversed or otherwise varied, the connections between elements may be direct or indirect, such that there may be one or more intermediate elements connected in between, and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions, and arrangement of the exemplary embodiments without departing from the scope of the present disclosure. For example, the embodiments of the present disclosure may be implemented by a single device and/or system or implemented by a combination of separate devices and/or systems.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer (e.g., ASICs or FPGAs) or any other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

Furthermore, the methods and processes discussed herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth used should be understood as being modifiable depending on system criteria and application parameters. In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

What is claimed is:

1. An apparatus, comprising:
a pend list buffer configured to store a pend list;
a queue configured to store a plurality of issued communications; and
circuitry configured to receive a first queue depth value for a device, wherein the first queue depth value is indicative of an amount of the queue available for issued communications for the device, wherein the circuitry is configured to issue a first communication on the pend list for the device if the first queue depth value is more than a second queue depth value, the second queue depth value being a stored value.

2. The apparatus of claim 1, wherein the first queue depth value is for a read communication or for a write communication.

3. An apparatus, comprising:
a pend list buffer configured to store a pend list comprising a plurality of pended communications;
a queue buffer configured to store a plurality of issued communications; and
circuitry configured to issue a first communication at least partially in response to a queue depth value being more than an issued communication value, wherein the queue depth value is indicative of an amount of the queue buffer available for the issued communications from a first device and the issued communication value is indicative of an amount of issued communications for the first device stored in the queue buffer.

4. The apparatus of claim 3, wherein the circuitry is configured to list the first communication in the pend list in response to the queue depth value for the first device being less than or equal to the issued communication value.

5. The apparatus of claim 4, wherein the circuitry is configured to perform throttling, wherein the first communication is untranslated when listed on the pend list.

6. The apparatus of claim 4, further comprising a set of registers comprising a tail pointer register configured to store information related to the first communication when listed on the pend list.

7. The apparatus of claim 6, wherein the set of registers comprises a third register configured to store the queue depth value for a second device and a fourth register configured to store the issued communication value for the second device.

8. The apparatus of claim 3, wherein the circuitry is a hardware circuit configured as a memory controller.

9. The apparatus of claim 3, further comprising:
a set of registers comprising a first register configured to store the queue depth value for the first device and a second register configured to store the issued communication value for the first device.

10. A controller, comprising:
a queue buffer configured to store a plurality of issued communications; and
circuitry configured to issue a first communication for translation if a queue depth value is less than an issued communication value, wherein the queue depth value is indicative of an amount of the queue buffer available for the issued communications from a device and the issued communication value is indicative of an amount of issued communications stored in the queue buffer for the device.

11. The controller of claim 10 further comprising:
a pend list buffer configured to store a pend list, wherein the circuitry is configured to list the first communication in the pend list if the queue depth value for the device more than or equal to the issued communication value.

12. The controller of claim 10, wherein the circuitry is configured to issue the first communication if the queue depth value for the device is not more than zero.

13. The controller of claim 11, wherein the circuitry is configured to list the first communication on for the device if a pend count value for the device is not zero, the pend count value being indicative of the number of communications on the pend list.

14. The controller of claim 11, wherein the pend list uses a head pointer and tail pointer to indicate communications on the pend list.

15. The controller of claim 10, wherein the circuitry is configured to perform hardware based device level throttling is performed by issuing the first communication if the issued communication value for the device is less than the queue depth value for the device and listing the first communication on a pend list for the device if the queue depth value for the device is less than or equal to the issued communication value.

16. The controller of claim 11, wherein the circuitry is configured to decrement the issued communication value when the first communication is completed and issue a second communication from the pend list if the issued communication value is less than the queue depth value.

17. The controller of claim 11, wherein the circuitry is configured to issue a second communication from the pend list if a new queue depth value is provided that is greater than the queue depth value.

18. The controller of claim 10, further comprising:
a set of registers comprising a first register configured to store the queue depth value for the device and a second register configured to store the issued communication value for the device.

19. The controller of claim 11, further comprising:
a set of registers comprising a tail pointer register configured to store information related to the first communication when listed on the pend list.

20. The controller of claim 19, wherein the set of registers comprises a third register configured to store the queue depth value for another device and a fourth register configured to store the issued communication value for the another device.

* * * * *